US009272576B2

(12) United States Patent
Dotson et al.

(10) Patent No.: US 9,272,576 B2
(45) Date of Patent: Mar. 1, 2016

(54) STRUCTURALLY SUPPORTED, NON-PNEUMATIC WHEEL WITH CONTINUOUS LOOP REINFORCEMENT ASSEMBLY

(75) Inventors: Michael Edward Dotson, Greenville, SC (US); Patrick A. Petri, Greer, SC (US); Kirkland W. Vogt, Simpsonville, SC (US)

(73) Assignees: MICHELIN RECHERCHE et TECHNIQUE S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 150 days.

(21) Appl. No.: 13/581,003

(22) PCT Filed: Mar. 11, 2011

(86) PCT No.: PCT/US2011/028078
§ 371 (c)(1),
(2), (4) Date: Aug. 24, 2012

(87) PCT Pub. No.: WO2011/112920
PCT Pub. Date: Sep. 15, 2011

(65) Prior Publication Data
US 2012/0318417 A1  Dec. 20, 2012

Related U.S. Application Data

(60) Provisional application No. 61/428,074, filed on Dec. 29, 2010.

(51) Int. Cl.
  *B60B 1/00* (2006.01)
  *B60C 7/10* (2006.01)
  (Continued)

(52) U.S. Cl.
  CPC . *B60C 7/10* (2013.01); *B60C 7/105* (2013.04); *B60C 7/22* (2013.01); *B60C 9/1807* (2013.04); *B60C 2007/107* (2013.04); *B60C 2007/146* (2013.04); *B60C 2009/1871* (2013.04)

(58) Field of Classification Search
  CPC ........... B29D 30/02; B60C 7/08; B60C 7/10; B60C 7/105; B60C 7/12; B60C 7/22; B60C 9/1807
  USPC ........... 152/1, 5, 7, 11, 12, 17, 250, 251, 286, 152/246, 300, 301, 302, 303, 310, 311
  See application file for complete search history.

(56) References Cited

U.S. PATENT DOCUMENTS 1,440,974 A    2/1923   Dornburgh
1,495,083 A    5/1924   Krusemark
(Continued)

FOREIGN PATENT DOCUMENTS

BR    199902986 A    3/2000
DE    2619942        11/1977
(Continued)

OTHER PUBLICATIONS

PCT International Search Report for PCT/US2011/030467, dated Jun. 13, 2011.
(Continued)

*Primary Examiner* — S. Joseph Morano
*Assistant Examiner* — Jean Charleston
(74) *Attorney, Agent, or Firm* — Dority & Manning, P.A.

(57) ABSTRACT

A non-pneumatic wheel is provided having a continuous loop reinforcement assembly that can support a load and have performance similar to pneumatic tires. Various configurations of a non-pneumatic wheel, including variations of the continuous loop reinforcement assembly, are provided. One or more resilient spacers can be positioned with the continuous loop reinforcement assembly and can be configured for the receipt of a matrix material.

20 Claims, 8 Drawing Sheets

(51) Int. Cl.
  *B60C 7/22*  (2006.01)
  *B60C 9/18*  (2006.01)

(56) References Cited

U.S. PATENT DOCUMENTS

| | | | |
|---|---|---|---|
| 2,388,421 | A | 11/1945 | Kraft et al. |
| 3,779,835 | A | 12/1973 | Lohr et al. |
| 3,973,613 | A | 8/1976 | Marzocchi |
| 4,024,895 | A * | 5/1977 | Barron ............ 139/426 R |
| 4,073,330 | A * | 2/1978 | Allard .............. 152/530 |
| 4,734,144 | A | 3/1988 | Markow |
| 4,794,966 | A | 1/1989 | Markow |
| 4,966,212 | A | 10/1990 | Hill |
| 5,221,382 | A * | 6/1993 | Sid-Ahmed ........ 152/451 |
| 5,265,659 | A | 11/1993 | Pajtas et al. |
| 5,565,257 | A | 10/1996 | Tingley |
| 5,837,077 | A | 11/1998 | Kabe et al. |
| 5,906,836 | A | 5/1999 | Panaroni et al. |
| 6,109,319 | A | 8/2000 | Gardetto |
| 6,422,279 | B1 | 7/2002 | Williams et al. |
| 6,460,586 | B1 | 10/2002 | Spragg et al. |
| 6,470,937 | B1 | 10/2002 | Spragg et al. |
| 6,701,987 | B1 | 3/2004 | Abbott |
| 6,769,465 | B2 | 8/2004 | Rhyne et al. |
| 6,792,986 | B2 | 9/2004 | Allen et al. |
| 6,994,134 | B2 | 2/2006 | Grah |
| 7,013,939 | B2 * | 3/2006 | Rhyne et al. ............ 152/5 |
| 7,125,083 | B2 | 10/2006 | Piumarta et al. |
| 7,201,194 | B2 * | 4/2007 | Rhyne et al. ............ 152/5 |
| 7,363,805 | B2 | 4/2008 | Jayakumar et al. |
| 7,418,988 | B2 | 9/2008 | Cron et al. |
| 7,650,919 | B2 | 1/2010 | Rhyne et al. |
| 7,931,062 | B2 * | 4/2011 | Michiels et al. ....... 152/533 |
| 2004/0012246 | A1 | 1/2004 | Rhyne et al. |
| 2007/0267116 | A1 | 11/2007 | Rhyne et al. |
| 2008/0250843 | A1 | 10/2008 | Albohr et al. |
| 2008/0314486 | A1 | 12/2008 | Manesh et al. |
| 2009/0071584 | A1 | 3/2009 | Zhang et al. |
| 2010/0018621 | A1 | 1/2010 | Thompson |
| 2011/0223366 | A1 | 9/2011 | Petri et al. |

FOREIGN PATENT DOCUMENTS

| | | |
|---|---|---|
| EP | 0073313 A2 | 3/1983 |
| EP | 0732225 | 9/1986 |
| EP | 0400859 A2 | 12/1990 |
| EP | 853009 A2 | 7/1998 |
| EP | 974449 A2 | 1/2000 |
| EP | 1980420 A1 | 10/2008 |
| GB | 1257017 | 12/1971 |
| JP | 3952211 | 8/2007 |
| JP | 2000289416 | 3/2008 |
| WO | WO 94/11185 A1 | 5/1994 |
| WO | WO 02/43974 A1 | 6/2002 |
| WO | WO 03/018332 A1 | 3/2003 |
| WO | WO 2005/007422 A1 | 1/2005 |
| WO | WO 2008/045098 A1 | 4/2008 |
| WO | WO 2008/050503 A1 | 5/2008 |
| WO | WO 2008/102048 A1 | 8/2008 |
| WO | WO 2009/005946 A1 | 1/2009 |
| WO | WO 2009/144244 | 12/2009 |

OTHER PUBLICATIONS

PCT International Search Report for PCT/US2011/050905, dated Jul. 14, 2008.

PCT International Search Report for PCT/US2011/042310, dated Nov. 3, 2011.

PCT International Search Report for PCT/US2009/060746, dated Jan. 12, 2010.

PCT International Search Report for PCT/US2011/042533, dated Dec. 6, 2011.

* cited by examiner

STRUCTURALLY SUPPORTED, NON-PNEUMATIC WHEEL WITH CONTINUOUS LOOP REINFORCEMENT ASSEMBLY

PRIORITY CLAIM

This application is a 371 of International Application No. PCT/US2011/028078, which claims the benefit of priority of U.S. patent application Ser. No. 12/661,196, filed Mar. 12, 2010, and U.S. Provisional Patent Application No. 61/428,074, filed Dec. 29, 2010, which are incorporated herein by reference for all purposes.

FIELD OF THE INVENTION

The present invention relates to a non-pneumatic wheel. More particularly, the invention relates to non-pneumatic wheel having a continuous loop reinforcement assembly that can support a load and have performance similar to pneumatic tires.

BACKGROUND OF THE INVENTION

The pneumatic tire is a known solution for compliance, comfort, mass, and rolling resistance; however, the pneumatic tire has disadvantages in complexity, the need for maintenance, and susceptibility to damage. A device that improves on pneumatic tire performance could, for example, provide more compliance, better control of stiffness, lower maintenance requirements, and resistance to damage.

Conventional solid tires, spring tires, and cushion tires, although lacking the need for maintenance and the susceptibility to damage of pneumatic tires, unfortunately lack its performance advantages. In particular, solid and cushion tires typically include a solid rim surrounded by a resilient material layer. These tires rely on compression of the ground-contacting portion of the resilient layer directly under the load for load support. These types of tires can be heavy and stiff and lack the shock absorbing capability of pneumatic tires.

Spring tires typically have a rigid wood, metal or plastic ring with springs or spring like elements connecting it to a hub. While the hub is thereby suspended by the springs, the inflexible ring has only a small contact area with the road, which offers essentially no compliance, and provides poor traction and steering control.

Accordingly, a non-pneumatic wheel having performance characteristics similar to pneumatic wheel would be useful. More particularly, a non-pneumatic wheel that does not require an air inflation pressure in order to provide performance characteristics of a pneumatic tire would be beneficial. Such a non-pneumatic wheel that can a constructed with a hub or connected to a hub for mounting on a vehicle or other transport device would also be very useful.

SUMMARY OF THE INVENTION

Aspects and advantages of the invention will be set forth in part in the following description, or may be obvious from the description, or may be learned through practice of the invention.

In an exemplary embodiment, the present invention provides a non-pneumatic wheel that defines radial, circumferential, and transverse directions. The wheel includes an annular band supporting a ground contacting tread portion and extending about the circumferential direction. A continuous loop reinforcement assembly is positioned within the annular band. A mounting band is positioned radially-inward of the annular band. A plurality of web spokes are connected to, and extending radially between, the annular band and the mounting band.

The continuous loop reinforcement assembly can include a first flexible cylindrical band and a second flexible cylindrical band positioned apart from, and radially outward of, the first flexible cylindrical band. One or both of the first flexible cylindrical band and the second flexible cylindrical band can include a coil comprising one or more materials wound into a helix and at least one retainer attached to the coil and configured for maintaining the integrity of the coil. The one or more materials of the coil can include materials selected from the group comprising metal, steel, carbon, aramid, and glass.

The at least one retainer can include a higher melt temperature material and a lower melt temperature material. The higher melt temperature material and the lower melt temperature material can be configured in a core/sheath arrangement. The at least one retainer can include one or more of the group comprising a monofilament yarn, multifilament yarn, and staple fiber yarns. The at least one retainer can include a tie reinforcing yarn and a structural reinforcing yarn having a greater stiffness than the tie reinforcing yarn. The tie reinforcing yarn can include a material having a lower melt temperature than the melt temperature of the structural reinforcing yarn. The structural reinforcing yarn can have a low shrinkage when heated to the lower melt temperature of the tie reinforcing yarn. The tie reinforcing yarn can include a lower melt temperature polymer and a higher melt temperature polymer, wherein the higher melt temperature polymer exhibits shrinkage when heated to the melt temperature of the lower melt temperature polymer. The at least one retainer can include a plurality of reinforcing yarns woven into the coil in a leno weave with cross-overs of the yarns occurring between the one or more materials of the coil. The at least one retainer can include a plurality of reinforcing yarns tied the coil in a Malimo style stitch knit pattern.

The continuous loop reinforcement assembly can include a spacer positioned between the first flexible cylindrical band and the second flexible cylindrical band. The spacer can include a porous material, which may be e.g., a reticulated foam. The annular band may include a matrix material that is received into the porous material of the spacer. The matrix material may be constructed from e.g., a polyurethane.

The continuous loop reinforcement assembly can include a plurality of spacers positioned between the first flexible cylindrical band and the second flexible cylindrical band. The continuous loop reinforcement assembly can include a plurality of flexible cylindrical bands that are spaced apart from each other along the radial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

The present invention provides a non-pneumatic wheel having a continuous loop reinforcement assembly that can support a load and have performance similar to pneumatic tires. Various configurations of a non-pneumatic wheel, including variations of the continuous loop reinforcement assembly, are provided. One or more resilient spacers can be positioned with the continuous loop reinforcement assembly and can be configured for the receipt of a matrix material.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield still further embodiments or methods. Thus, it is intended that the present invention covers such modifications and variations as come within the scope of the appended claims and their equivalents.

Figure 1:
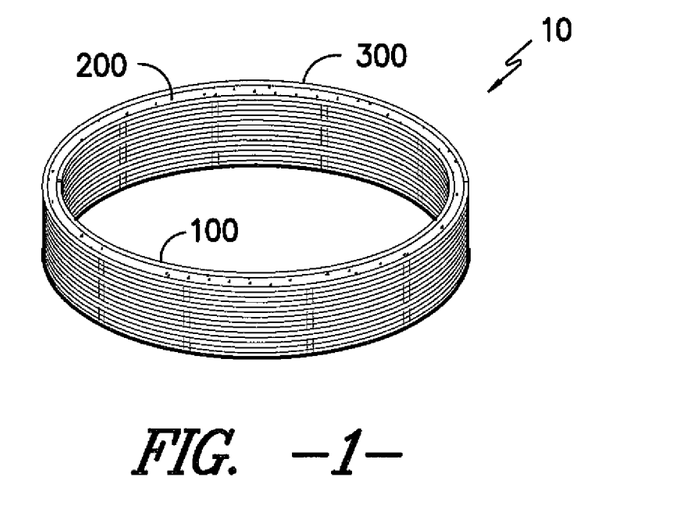
FIG. 1 is a perspective view of an exemplary embodiment of a continuous loop reinforcement assembly 10 of the present invention having a first flexible cylindrical reinforcement band 100, a intermediate resilient spacer 200, and a second flexible cylindrical reinforcement band 300.

Referring now to FIG. 1, there is shown an exemplary embodiment of a continuous loop reinforcement assembly 10 of the present invention. The continuous loop reinforcement assembly 10 provides reinforcement for a matrix material, such as an epoxy, polyurethane, or other elastomer. Assembly 10 can be incorporated into a non-pneumatic wheel to provide compliant, structural reinforcement as will be further described. The continuous loop reinforcement assembly 10 is porous for receiving the matrix material and being embedded within a non-pneumatic wheel. The continuous loop reinforcement assembly 10 in the present invention is flexible in the radial direction to provide for distributing radial forces applied to the non-pneumatic wheel that is reinforced by the continuous loop reinforcement assembly 10. As used herein, continuous loop reinforcement means the inclusion or one or more yarns or cables that are wound into a helix that includes at least three revolutions. More specifically, the one or more yarns or cables continue around to itself without the use of a seam across the band.

As illustrated in FIGS. 1 through 4, and 6, the continuous loop reinforcement assembly 10 includes a first flexible cylindrical reinforcement band 100, a second flexible cylindrical reinforcement band 300, and a intermediate resilient spacer 200 disposed between the first flexible cylindrical reinforcement band 100 and the second flexible cylindrical reinforcement band 300. The first flexible cylindrical reinforcement band 100 has a first band inner surface 101 and a first band outer surface 102. The second flexible cylindrical reinforcement band 300 has a second band inner surface 301 and a second band outer surface 302. The intermediate resilient spacer 200 (FIG. 6) has a spacer inner surface 201 that engages the first band outer surface 102, and a spacer outer surface 202 that engages the second band inner surface 301.

The first flexible cylindrical band 100 (FIG. 2) is a cylindrical member with flexibility in the radial direction. In a preferred embodiment, the first flexible cylindrical band 100 has a flexibility wherein the first flexible cylindrical band 100 can be subjected to a bend radius that is one-tenth or less of its normal inside diameter in the continuous loop reinforcing assembly 10 without experiencing a permanent set to the material. Because the first flexible cylindrical band 100 is a reinforcing component of the continuous loop reinforcing assembly 10, the Young's Modulus of the material in the first flexible cylindrical band 100 along its tangential direction will be greater than the Young's Modulus of the matrix reinforced by the first cylindrical band 100. In one preferred embodiment, the Young's Modulus of the first flexible cylindrical band 100 is at least 1,000 times greater than the Young's Modulus of the matrix reinforced by the first flexible cylindrical band 100.

Figure 2:
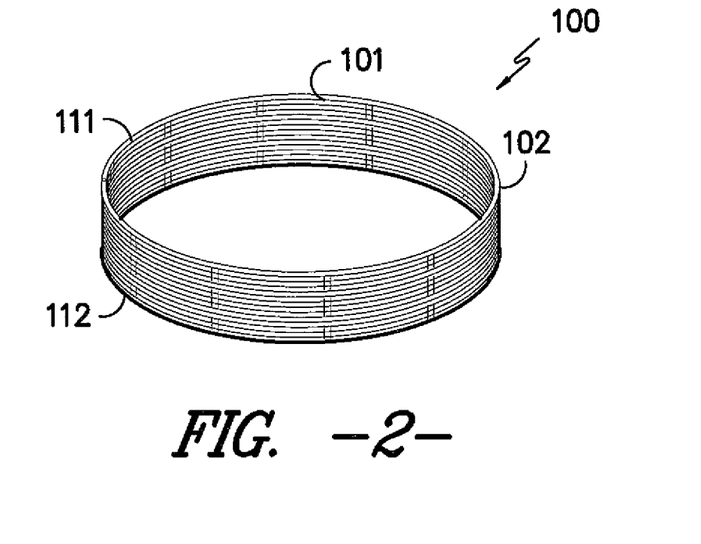
FIG. 2 is a perspective view of the first flexible cylindrical reinforcement band 100 from FIG. 1.

For the embodiment illustrated in FIG. 2, the first flexible cylindrical band 100 comprises a continuous band of a coil 110 (FIGS. 3A and 3B), such as a coil formed from one or more yarns or cables 111 wound into a helix, each cable 111 making at least three revolutions around the first flexible cylindrical band 100. As used herein, a "continuous band" is a band that continues around to itself without the use of a seam across the band. The cables 111 have high longitudinal tension and compression stiffness, and flexibility in the tangential direction. Preferred materials for the cables 111 would include high modulus materials such as metal, steel, carbon, aramid, or glass fibers.

Multiple retainers 112 can attach to cable 111 for maintaining the integrity of the coil 110. The retainers 112 can be a polymeric material woven into the cables 111, a metal strip crimped to the cables 111, or the like. The retainers 112 provide an axial stiffness to the first flexible cylindrical band 100 prior to incorporation of the matrix material with the continuous loop reinforcement assembly 10.

Figure 3A:
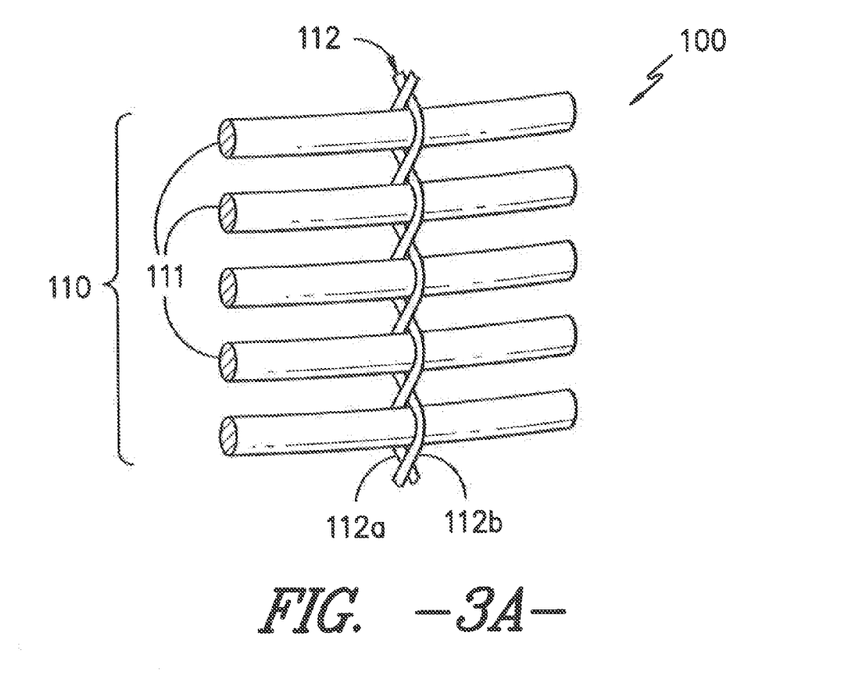
FIGS. 3A and 3B are a partial view of two embodiments of the first flexible cylindrical reinforcement band 100 from FIG. 2.
Figure 3B:
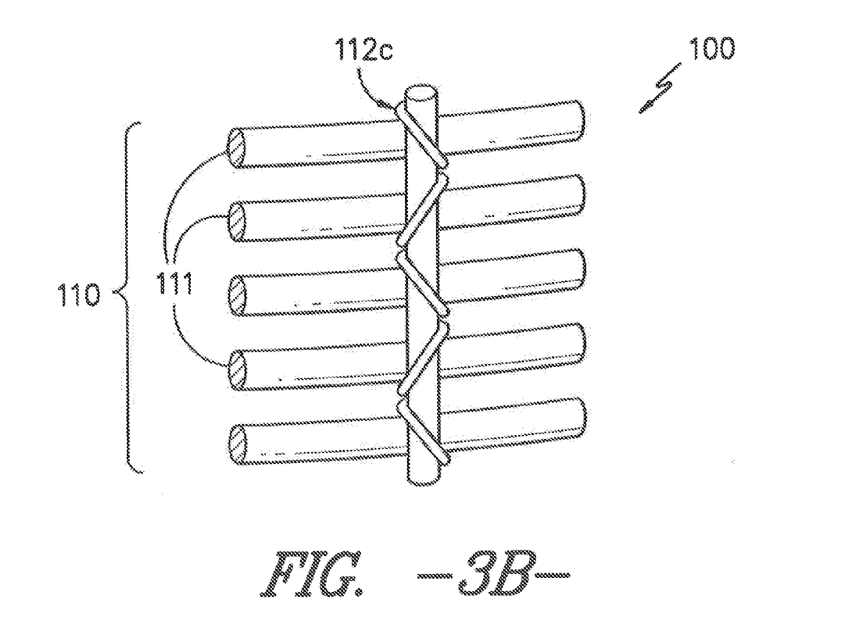

Referring now to FIGS. 3A and 3B, there are shown two embodiments of the first flexible cylindrical band 100 with the retainers 112 comprising reinforcing yarns 112a and 112b. The reinforcing yarns 112a and 112b can be different ends of a single yarn, or two different yarns. The reinforcing yarns 112a and 112b are woven or knitted longitudinally into the coil 110 in between the cables 111. The reinforcing yarns 112a and 112b need to be flexible enough to incorporate into the coil 110, but provide axial stiffness to the first flexible cylindrical reinforcement band 100.

Still referring to FIGS. 3A and 3B, in one preferred embodiment at least one of the reinforcing yarns 112a and 112b comprise polymeric yarn with a higher melt temperature material and a lower melt temperature material. In a preferred embodiment, both of the reinforcing yarns 112a and 112b comprise polymeric yarns with a higher melt temperature material and a lower melt temperature material. Prior to any melt bonding of the two melt temperature materials, the reinforcing yarns 112a and 112b are incorporated into the coil 110. In this manner, the reinforcing yarns 112a and 112b are flexible enough to be incorporated into the coil 110 with minimum difficulty. After the reinforcing yarns are incorporated into the coil 110, the sub-assembly is subjected to a temperature above the melt temperature of the lower melt temperature material, and below the melt temperature of the higher melt temperature material. After the lower melt temperature material is melted, the temperature is lowered below its melt temperature, melt bonding the lower melt temperature material to the higher temperature material thereby creating a fused reinforcing spacing yarn. By fusing the reinforcing yarns 112a and 112b, the retainer 112 formed by the yarns becomes more rigid. This extra rigidity provides the first flexible cylindrical band with an increased axial stiffness. In order to help maintain axial stability of the first flexible cylindrical reinforcement band 100 through the process of incorporation of the matrix with the continuous loop reinforcement assembly 10, it is preferred that the lower melt temperature material of the reinforcing yarns have a melt temperature above the formation or cure temperature of the matrix.

Referring still to FIGS. 3A and 3B, the reinforcing yarns 112a and 112b using different melt temperature materials can be formed of a fiber or fibers having the materials with the different melting points, such as core/sheath fibers, or can be formed from a combination of fibers having different melting points. The reinforcing yarns 112a and 112b can be monofilament yarns, multifilament yarns, or staple fiber yarns. When selecting yarns for the reinforcing yarns 112a and 112b, attention should be given to selecting yarns that will withstand the friction forces of assembly and any processing of the continuous loop reinforcing assembly 10 prior to incorporation with the matrix, such as washing. It is preferable that the higher melt temperature material of such reinforcing yarns be selected to have sufficient elasticity to reduce the likelihood of assembly problems. It is also preferable that the higher melt temperature material of such reinforcing yarns be selected to have low shrinkage characteristics, particularly when subjected to the heat of fusing the reinforcing yarns and incorporation of the matrix material into the continuous loop reinforcement assembly. In one embodiment the filament or fibers are a core and sheath configuration with the higher melt temperature polymer being the core and the lower melt temperature polymer being the sheath. In another embodiment, the yarn comprises filaments or fibers of the higher melt temperature polymer and separate filaments or fibers of the lower melt temperature polymer.

Still referring to FIGS. 3A and 3B, reinforcing yarn 112a is illustrated as a structural yarn and reinforcing yarn 112b is illustrated as a tie yarn. The structural reinforcing yarn 112a is stiffer and heavier than the tie reinforcing yarn 112b. The structural reinforcing yarn 112a provides axial rigidity to the coil 110. The reinforcing yarn 112a can be secured to the outside or the inside of the coil 110. In one embodiment, the structural reinforcing yarn 112a is a monofilament yarn. The tie reinforcing yarn 112b secures the cables 111 of the coil adjacent to the structural reinforcing yarn 112a. In one embodiment the tie reinforcing yarn 112b includes a lower melt temperature polymer material as described above, and can include a higher melt temperature polymer material as described above. The melt temperature of the lower melt temperature polymer material in the tie yarn is a lower temperature than the melt temperature of the primary materials in the structural reinforcing yarn 112a. In this manner, the tie reinforcing yarn 112b can be used to better secure the cables 111 of the coil 110 to the structural reinforcing yarn.

When using a tie reinforcing yarn 112b having a polymer with a lower melting temperature, it is preferred that the structural reinforcing yarn 112a have low shrinkage when subject to the melting temperature of the lower melting temperature polymer in the tie reinforcing yarn 112b, such as with a heat set polymer yarn. In one embodiment, the tie reinforcing yarn 112b includes filaments or staple fibers with the lower melt temperature, and filaments or staple fibers of the higher melting temperature. When the tie reinforcing yarn 112b includes filaments or staple fibers of both lower melt temperature and high melt temperature polymer, it is also preferred that the filament with the high melt temperature polymer have some shrink during melting of the lower melt temperature polymer, such as with a yarn that is not heat set, thereby cinching up the connection between the structural reinforcing yarn 112a and the at least one cable 111 of the coil 110.

Referring still to FIGS. 3A and 3B, there are shown two different patterns for the reinforcing yarns 112a and 112b. In FIG. 3A, the reinforcing yarns 112a and 112b secure the cables 111 of the coil 110 with a weave pattern. As illustrated in FIG. 3A, the reinforcing yarns 112a and 112b are woven into the coil 110 in a leno weave, with cross-overs of the yarns occurring between cables. However, the reinforcing yarns 112a and 112b could be incorporated into the coil 110 with other weave patterns. In FIG. 3B, the reinforcing yarns 112a and 112b secure the cables 111 of the coil 110 with a Malin® style stitch knit pattern. However, the reinforcing yarns 112a and 112b could be incorporated into the coil 110 with other knit patterns. Although FIGS. 3A and 3B illustrate the reinforcing yarns 112a and 112b as being incorporated into the coil 110 with a weave or knit pattern, a series of single reinforcing yarns 112 could also be wound through the coil 110.

Figure 4:
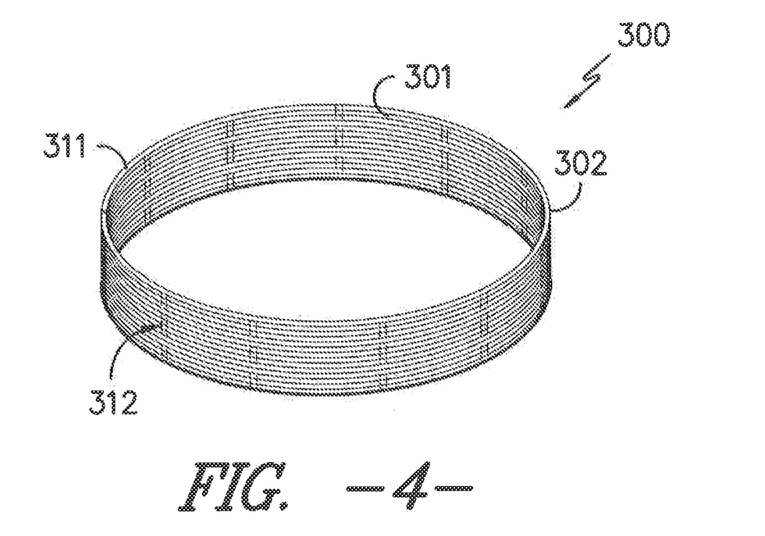
FIG. 4 is a perspective view of the second flexible cylindrical reinforcement band 300 from FIG. 1.

Referring now to FIG. 4, the second flexible cylindrical band 300 is a cylindrical member with flexibility in the radial direction. In a preferred embodiment, the second flexible cylindrical band 300 has a flexibility wherein the second flexible cylindrical band 300 can be subjected to a bend radius that is one-tenth or less of its normal inside diameter in the continuous loop reinforcing assembly 10 without experiencing a permanent set to the material. Because the second flexible cylindrical band 300 is a reinforcing component of the continuous loop reinforcing assembly 10, the Young's Modulus of the material in the second flexible cylindrical band 300 in the tangential direction will be greater than the Young's Modulus of the matrix reinforced by the second flexible cylindrical band 300. In one preferred embodiment, the Young's Modulus of the second flexible cylindrical band 300 is at least 1,000 times greater than the Young's Modulus of the matrix reinforced by the second flexible cylindrical band 300.

In the embodiment illustrated in FIG. 4, the second flexible cylindrical band 300 comprises a continuous band of a coil 310, such as a coil formed from one or more cables 311 wound into a helix, each cable 311 making at least three revolutions around the second flexible cylindrical band 300. The cables 311 have high longitudinal tension and compression stiffness, and flexibility in the tangential direction. Preferred materials for the cables 311 would include high modulus materials such as metal, steel, carbon, aramid, or glass fibers. Multiple retainers 312 can attach to cable 311 for maintaining the integrity of the coil 310. Retainers 312 can be a polymeric material woven into the cables 311, a metal strip crimped to the cables 311, or the like. The retainers 312 provide an axial stiffness to the second flexible cylindrical band 300 prior to incorporation of the matrix material with the continuous loop reinforcement assembly 10.

Figure 5A:
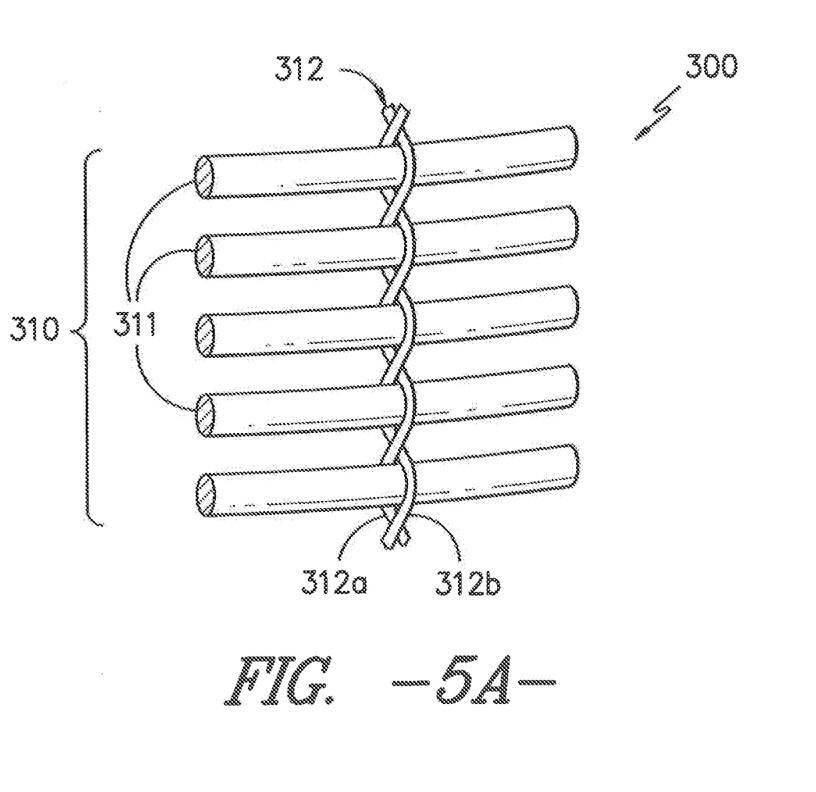
FIGS. 5A and 5B are a partial view of two embodiments of the second flexible cylindrical reinforcement band 300 from FIG. 4.
Figure 5B:
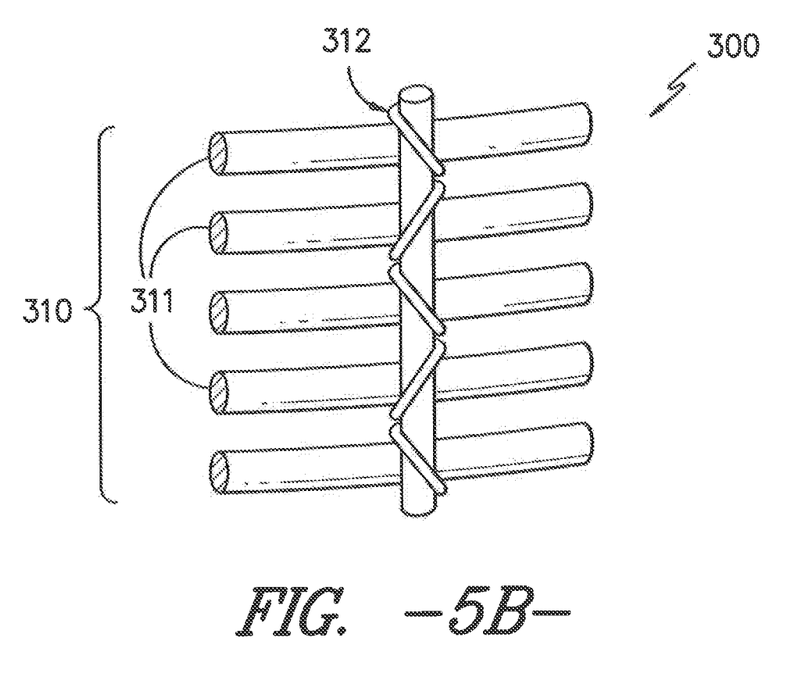

Referring now to FIGS. 5A and 5B, there are shown two embodiment of the second flexible cylindrical band 300 with the retainers 312 comprising reinforcing yarns 312a and 312b. The reinforcing yarns 312a and 312b can be different ends of a single yarn, or two different yarns. The reinforcing yarns 312a and 312b are woven longitudinally into the coil 310 in between the cables 311. The reinforcing yarns 312a and 312b need to be flexible enough to be incorporated into the coil 310, but provide axial stiffness to the second flexible cylindrical reinforcement band 300.

Still referring to FIGS. 5A and 5B, in one preferred embodiment at least one of the reinforcing yarns 312a and 312b comprise polymeric yarn with a higher melt temperature material and a lower melt temperature material. In a preferred embodiment, both of the reinforcing yarns 312a and 312b comprise polymeric yarns with a higher melt temperature material and a lower melt temperature material. Prior to any melt bonding of the two melt temperature materials, the reinforcing yarns 312a and 312b are incorporated into the coil 310. In this manner, the reinforcing yarns 312a and 312b are flexible enough to be incorporated into the coil 310 with minimum difficulty. After the reinforcing yarns are incorporated into the coil 310, the subassembly is subjected to a temperature above the melt temperature of the lower melt temperature material, and below the melt temperature of the higher melt temperature material. After the lower melt temperature material is melted, the temperature is lowered below its melt temperature, melt bonding the lower melt temperature material to the higher temperature material thereby creating a fused reinforcing spacing yarn. By fusing the reinforcing yarns 312a and 312b, the retainer 312 formed by the yarns becomes more rigid. This extra rigidity provides the first flexible cylindrical band with an increased axial stiffness. In order to help maintain axial stability of the second flexible cylindrical reinforcement band 300 through the process of incorporation of the matrix with the continuous loop reinforcement assembly 10, it is preferred that the lower melt temperature material of the reinforcing yarns have a melt temperature above the formation or cure temperature of the matrix.

Referring still to FIGS. 5A and 5B, the reinforcing yarns 312a and 312b using different melt temperature materials can be formed of a fiber or fibers having the materials with the different melting points, such as core/sheath fibers, or can be formed from a combination of fibers having different melting points. The reinforcing yarns 312a and 312b can be monofilament yarns, multifilament yarns, or staple yarns. When selecting yarns for the reinforcing yarns 312a and 312b, attention should be given to selecting yarns that will withstand the friction forces of assembly and any processing of the continuous loop reinforcing assembly 10 prior to incorporation with the matrix, such as washing. It is preferable that the higher melt temperature material of such reinforcing yarns be selected to have sufficient elasticity to reduce the likelihood of assembly problems. It is also preferable that the higher melt temperature material of such reinforcing yarns be selected to have low shrinkage characteristics, particularly when subjected to the heat of fusing the reinforcing yarns and incorporation of the matrix material into the continuous loop reinforcement assembly. In one embodiment the filament or fibers are a core and sheath configuration with the higher melt temperature polymer being the core and the lower melt temperature polymer being the sheath. In another embodiment, the yarn comprises filaments or fibers of the higher melt temperature polymer and separate filaments or fibers of the lower melt temperature polymer.

Still referring to FIGS. 5A and 5B, reinforcing yarn 312a is illustrated as a structural yarn and reinforcing yarn 312b is illustrated as a tie yarn. The structural reinforcing yarn 312a is stiffer and heavier than the tie reinforcing yarn 312b. The structural reinforcing yarn 312a provides axial rigidity to the coil 310. The reinforcing yarn 312a can be secured to the outside or the inside of the coil 310. In one embodiment, the structural reinforcing yarn 312a is a monofilament yarn. The tie reinforcing yarn 312b secures the cables 311 of the coil adjacent to the structural reinforcing yarn 312a. In one embodiment the tie reinforcing yarn 312b includes a lower melt temperature polymer material as described above, and can include a higher melt temperature polymer material as described above. The melt temperature of the lower melt temperature polymer material in the tie yarn is a lower temperature than the primary materials in the structural reinforcing yarn 312a. In this manner, the tie reinforcing yarn 312b can be used to better secure the cables 311 of the coil 310 to the structural reinforcing yarn.

When using a tie reinforcing yarn 312b having a polymer with a lower inciting temperature, it is preferred that the structural reinforcing yarn 312a have low shrinkage when subject to the melting temperature of the lower melting temperature polymer in the tie reinforcing yarn 312b, such as with a heat set polymer yarn. In one embodiment, the tie reinforcing yarn 312b includes filaments or staple fibers with the lower melt temperature, and filaments or staple fibers of the higher melting temperature. When the tie reinforcing yarn 312b includes filaments or staple fibers of both lower melt temperature and high melt temperature polymer, it is also preferred that the filament with the high melt temperature polymer have some shrink during melting of the lower melt temperature polymer, such as with a yarn that is not heat set, thereby cinching up the connection between the structural reinforcing yarn 312a and the at least one cable 311 of the coil 310.

Referring still to FIGS. 5A and 5B, there are shown two different patterns for the reinforcing yarns 312a and 312b. In FIG. 5A, the reinforcing yarns 312a and 312b secure the cables 311 of the coil 310 with a weave pattern. As illustrated in FIG. 5A, the reinforcing yarns 312a and 312b are woven into the coil 310 in a leno weave, with cross-overs of the yarns occurring between cables. However, the reinforcing yarns 312a and 312b could be incorporated into the coil 310 with other weave patterns. In FIG. 5B, the reinforcing yarns 312a and 312b secure the cables 311 of the coil 310 with a Malimo style stitch knit pattern. However, the reinforcing yarns 312a and 312b could be incorporated into the coil 310 with other knit patterns. Although FIGS. 5A and 5B illustrate the reinforcing yarns 312a and 312b as being incorporated into the coil 310 with a weave or knit pattern, a series of single reinforcing yarns 312 could also be wound through the coil 310.

Referring now to FIGS. 1-6, the intermediate resilient spacer 200 is a resilient material that applies a constant pressure to the first band outer surface 102 and the second band inner surface 301. What is meant by resilient is that the resilient spacer generates increasing reaction forces with increasing amounts of compression. The thickness of the intermediate resilient spacer 200 in the radial direction is greater than the space created between the first flexible cylindrical reinforcement band 100 and the second flexible cylindrical reinforcement band 300 in the radial direction. In this manner, the intermediate resilient spacer 200 exerts constant pressure between the two flexible cylindrical reinforcement bands 100, 300, around the continuous loop reinforcement assembly 10. To help create a uniform pressure around the continuous loop reinforcement assembly 10, the intermediate resilient spacer 200 preferably has a substantially uniform thickness and is substantially uniform in composition. This constant even pressure maintains the spatial relationship between the first flexible cylindrical band 100 and the second flexible cylindrical reinforcement band 300. The even pressure between the first flexible cylindrical reinforcement band 100 and the second flexible cylindrical reinforcement band 300 creates a force equilibrium that will maintain centering of the two bands even if there are variations in the diameter of the first or second flexible cylindrical bands 100, 300. In designing the intermediate resilient spacer 200, caution must be exercised to prevent excessive pressure on the first flexible cylindrical reinforcement band 100. When the intermediate resilient spacer 200 exerts excessive pressure on the first flexible cylindrical reinforcement band 100, the first flexible cylindrical reinforcement band 100 will buckle deforming the shape. In one embodiment, the intermediate resilient spacer 200 can elastically recover from at least 30% compression. In another embodiment, the materials forming the intermediate resilient spacer 200 can elastically recover from greater than an 80% compression.

Figure 6:
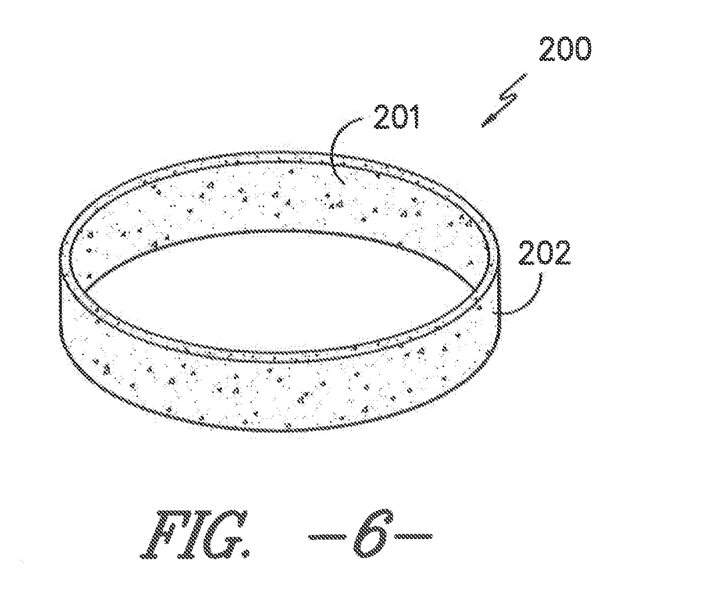
FIG. 6 is a perspective view of the intermediate resilient spacer 200 from FIG. 1.

Preferably, the intermediate resilient spacer 200 holds itself and the two reinforcing bands 100, 300, in place without additional fixation. Typically, the normal pressure and resulting friction between the intermediate resilient spacer 200 and the two reinforcing bands 100, 300, is sufficient to stabilize the continuous loop reinforcement assembly 10, even during incorporation of the matrix material when forming a cylindrical member. When the intermediate resilient spacer 200 exerts a pressure between the two flexible cylindrical reinforcing bands 100, 300, it also creates a bulge of the spacer material between the cables 111, 311. This bulge between the cables 111, 311, results in further stabilization of the continuous loop reinforcing assembly 10 and helps stabilize the position of the individual cables 111, 311, within the flexible cylindrical reinforcing bands 100, 300, respectively. In other embodiments, the intermediate resilient spacer 200 can use a material with very small protrusions or arms that hold the cables 111, 311, thereby stabilizing the position of the individual cables 111, 311, within the cylindrical reinforcing bands 100, 300, respectively. The stabilization of the reinforcing bands 100, 300, and the intermediate resilient spacer 200 can be improved with adhesives and material geometry that provides a gripping effect between the intermediate resilient spacer 200 and the flexible cylindrical reinforcing bands 100, 300. Increased friction, adhesion, or gripping between the intermediate resilient spacer 200 and the first flexible cylindrical reinforcing band 100 will also increase the pressure that can be exerted by the intermediate resilient spacer 200 to the first flexible cylindrical reinforcing band 100 before the onset of buckling of the first flexible cylindrical reinforcing band 100.

In addition to providing a spring like constant pressure between the two reinforcement bands 200, 300, the intermediate resilient spacer 200 is also porous for receiving the matrix material that is reinforced. Preferably, the intermediate resilient spacer 200 is porous without closed voids or torturous flow paths that reverse flow direction or create dead end flows. A porous material will include voids reducing the volume of the mass making up the porous material. It is preferable to increase the void area in a porous material by reducing the volume of the mass in a porous material to the minimum practical amount. As an example, the volume of the mass forming the porous material may have a maximum volume of forty percent (40%). Alternatively, the volume of the mass forming the porous material may have a maximum volume of fifteen percent (15%). In a preferred embodiment, the volume of the mass forming the porous material has a maximum volume of five percent (5%). Additionally, in one preferred embodiment, the intermediate resilient spacer 200 comprises the same material as in the matrix, such as polyurethane.

In a preferred embodiment of the present invention, the intermediate resilient spacer 200 is a flexible member. Flexing of the intermediate resilient spacer 200 facilitates the assembly of the continuous loop reinforcement assembly 10, and allows the final reinforced matrix member to flex without functional damage to the components of continuous loop reinforcement assembly 10 or the matrix. Similar to the first flexible cylindrical reinforcement band 100 and the second flexible cylindrical reinforcement band 300, it is preferable that the intermediate resilient spacer 200 have a flexibility wherein the intermediate resilient spacer 200 can be subjected to a bend radius that is one-tenth or less of its normal inside diameter in the continuous loop reinforcement assembly 10 without experiencing a permanent set to the material. In another preferred embodiment, the intermediate spacer 200 has a greater flexibility than the cylindrical reinforcement bands that it engages.

In one embodiment, the intermediate resilient spacer 200 can be a strip of material that is cut to the desired thickness, width, and length, and then inserted between the first reinforcement band 100 and the second reinforcement band 300. In one embodiment, the ends of the strip of material are attached to form the intermediate resilient spacer 200. In another embodiment, the strip of material placed between the first reinforcement band 100 and the second reinforcement band 300 as the intermediate resilient spacer 200, is a strip of material that is not attached at the ends with the ends loosely abutting each other. In some instances, it may be acceptable to have a small gap between the ends of a material forming the intermediate resilient spacer 200. Also, the axial width of the intermediate resilient spacer 200 does not always need to equal the full width of the reinforcement bands 100 or 300.

In one embodiment, the intermediate resilient spacer 200 is a foam material. In order to provide a spacer with the porous characteristics, the foam material can be an open cell foam material. In particular, a reticulated foam material provides a porous resilient material for the intermediate resilient spacer 200. In reticulated foam, cell walls are removed by methods such as passing a controlled flame or chemical etching fluid through the medium. The remaining material of the reticulated foam can also provide arms that secure the cables 111, 311, within the cylindrical reinforcing bands 100, 300. In addition, the foam material can be the same material as the matrix to be reinforced. For example, polyurethane foam can be used as the intermediate resilient spacer 200 in a cylindrical reinforcing member 10 to reinforce a polyurethane matrix.

In yet another embodiment, the intermediate resilient spacer 200 is a nonwoven material. One type of nonwoven material that could be used as the spacer is a nonwoven material with thick filaments which are formed into a three-dimensional shape, such as a two or three dimensional corrugated configuration. Nonwovens with thickness oriented, or "z" oriented, fibers can provide resilient properties to the nonwoven.

In yet even another embodiment, the intermediate resilient spacer 200 is a spacer fabric. A spacer fabric is a knit or woven fabric that has two face layers separated by fibers or yarns extending between the two layers. The fibers between the two layers provide a spring-like force that opposes the compression of the spacer fabric. Considerations for the spacer fabric would be openness, pore shape, pore size, stiffness, direction of the separating fiber or yarn, ability of material to adhere to the matrix material, and the like.

Figure 7:
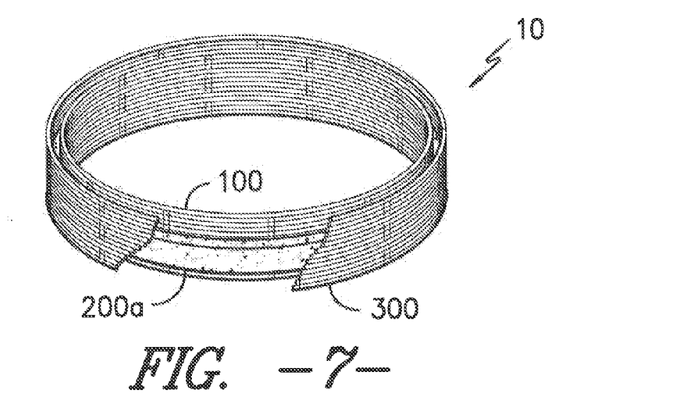
FIG. 7 is a perspective view of the continuous loop reinforcement assembly 10 with a break out illustrating another embodiment of the intermediate resilient spacer 200.

Referring now to FIG. 7, there is shown an embodiment of the present invention with the intermediate resilient spacer 200 having a width smaller than the width of the first cylindrical reinforcement band 100 or the second cylindrical reinforcement band 300. In this embodiment, the intermediate resilient spacer 200 is centered in the width direction of the continuous loop reinforcement assembly 10. The flexible cylindrical reinforcement bands 100, 300, are designed to maintain a constant spatial relationship between each other at widths beyond the intermediate resilient spacer 200.

Figure 8:
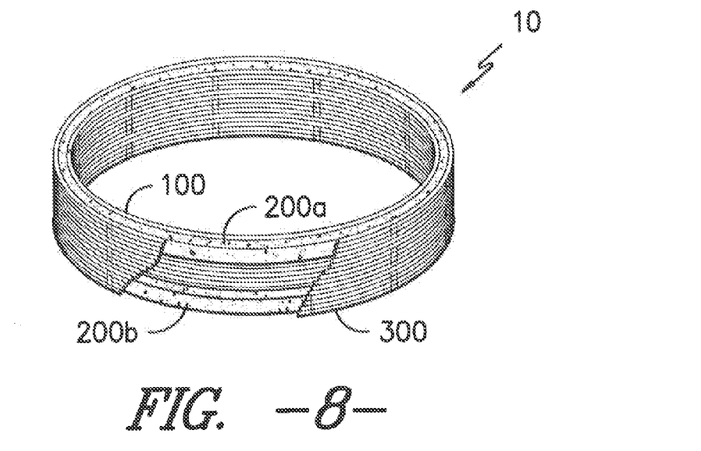
FIG. 8 is a perspective view of the continuous loop reinforcement assembly 10 with a break out illustrating yet another embodiment of the intermediate resilient spacer 200.

Referring now to FIG. 8, there is shown an embodiment of the present invention with the first flexible cylindrical reinforcement band 100 and the second flexible cylindrical reinforcement band 300 being spaced apart by two intermediate resilient spacers 200a and 200b. In this embodiment, the intermediate resilient spacers 200a and 200b are narrower than the flexible cylindrical reinforcement bands 100, 300, and are disposed towards opposing outer edges of the flexible cylindrical reinforcement bands 100, 300. By splitting the intermediate resilient spacer into two bands disposed at the outer edges of the flexible cylindrical reinforcement members 100, 300, the continuous loop reinforcement assembly 10 will have better resistance to out of plane rotational disturbances.

Figure 9:
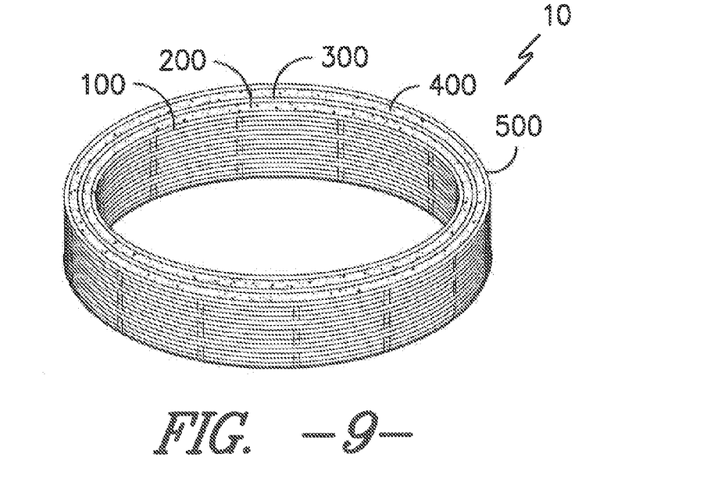
FIG. 9 is a perspective view of another embodiment of the continuous loop reinforcement assembly 10 with the first flexible cylindrical reinforcement band 100, the intermediate resilient spacer 200, and the second flexible cylindrical reinforcement band 300, and further including a second intermediate resilient spacer 400, and a third flexible cylindrical reinforcement band 500.

Referring now to FIG. 9, there is shown an embodiment of the present invention where a third flexible cylindrical reinforcement band 500 is disposed outside of the second flexible cylindrical reinforcement band 300, and a second intermediate resilient spacer 400 is disposed between the second flexible cylindrical reinforcement band 300 and the third cylindrical reinforcement band 500. The third flexible cylindrical reinforcement band 500 has the same properties and characteristics as the first flexible cylindrical reinforcement band 100 or the second flexible reinforcement band 300. The second intermediate resilient spacer 400 also has the same properties and characteristics as the intermediate flexible resilient spacer 200. It is contemplated that the cylindrical reinforcement assembly of the present invention could have multiple layers of cylindrical reinforcement bands separated by one or more intermediate, resilient layers.

In yet another exemplary embodiment, it should be understood that the continuous loop reinforcement assembly can manufactured without a resilient spacer as well. More specifically, referring to FIG. 1, continuous loop reinforcement assembly 10 can be created without resilient spacer 200. In such case, care should be taken to maintain the proper spacing of reinforcement bands 100 and 300 while manufacturing assembly 10. For example, between properly spaced reinforcement bands 100 and 300, a material could by dripped or drizzled so as not to disturb the spacing there-between. Such material should have a relatively high viscosity and should solidify while touching reinforcement bands 100 and 300 so as to maintain proper spacing. Preferably, such material will also have a higher melting temperature than the material used for construction of reinforcement bands 100 and 300. Other methods for manufacturing a continuous loop reinforcement assembly without a resilient spacer may be used as well.

Figure 10:
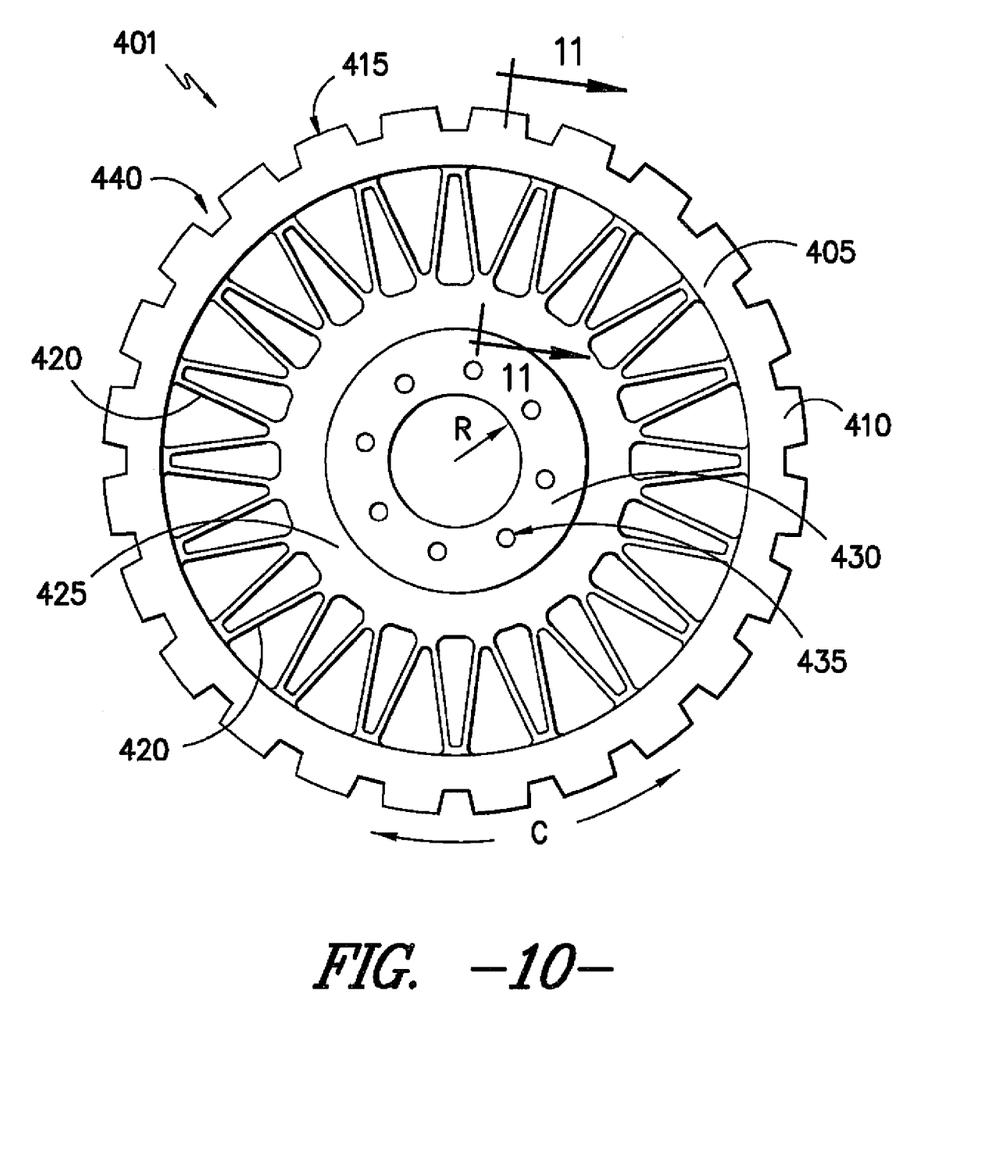
FIG. 10 is a perspective view of an exemplary embodiment of a non-pneumatic wheel 401 of the present invention.
Figure 11:
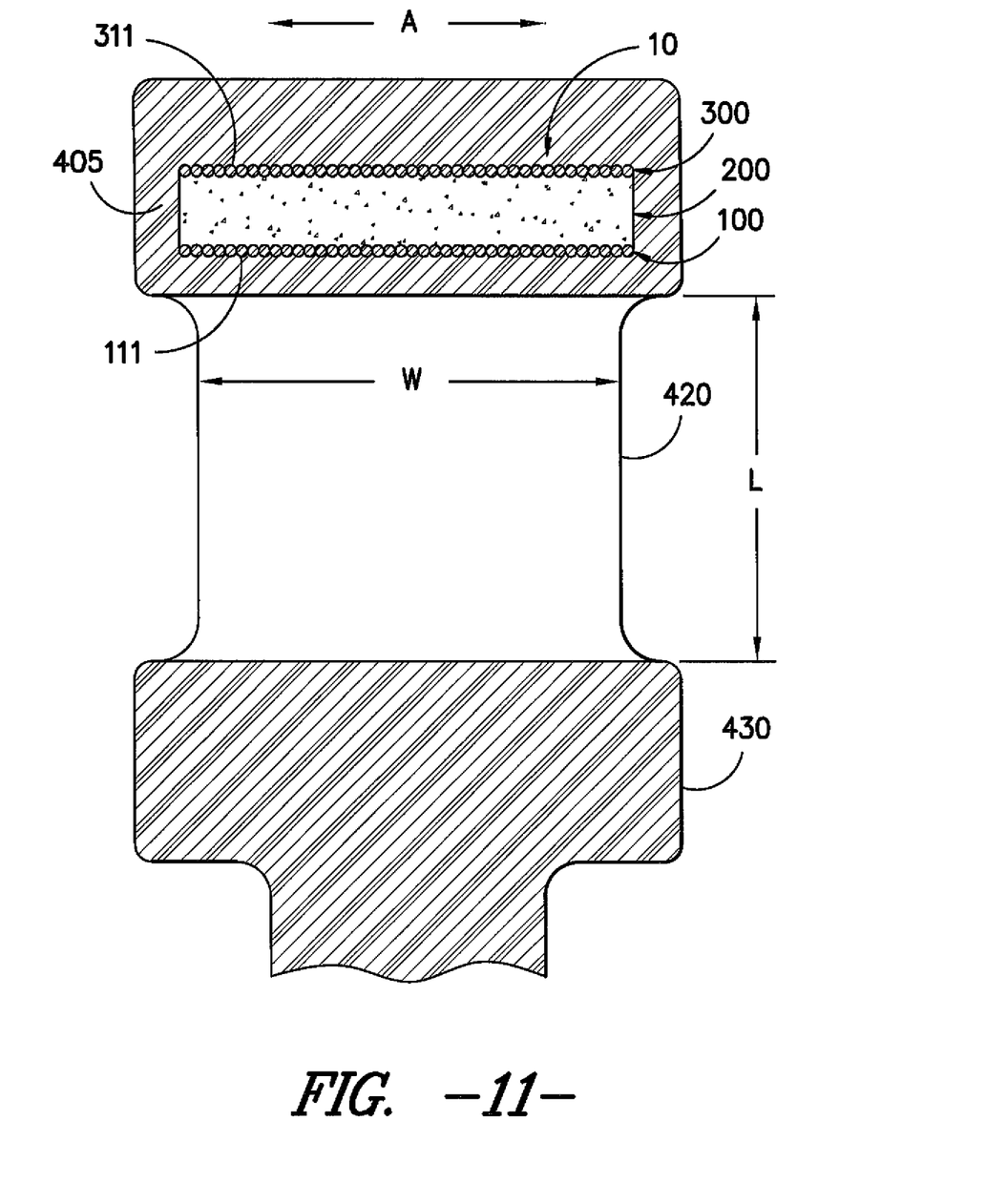
FIG. 11 is a partial, cross-sectional view of the exemplary embodiment of FIG. 10, taken along line 11-11.

FIG. 10 provides a perspective view of an exemplary embodiment of a structurally supported wheel 401 in accordance with the present invention. As used herein, structurally supported means that the tire carries a load by its structural components without the support of gas inflation pressure. FIG. 11 provides a partial, cross-sectional view of wheel 401 taken along line 11-11 as shown in FIG. 10. Arrows C denote the circumferential direction. Arrow R denotes the radial direction. Arrows A denotes axial direction, also referred to sometimes as the transverse or lateral direction.

Referring now more particularly to FIG. 11, continuous loop reinforcement assembly 10 is positioned within a band 405 extending about circumferential direction C. For this exemplary embodiment, assembly 10 includes first flexible cylindrical band 100 and second flexible cylindrical band 300 separated by resilient spacer 200 as previously described. Bands 100 and 300 provide e.g., vertical stiffness for wheel 401 while resilient spacer 200 assists in providing for a shear layer for wheel 401 as will be further described.

In accordance with the invention, wheel 401 is useful in applications where the traction, steering, or suspension qualities of a pneumatic tire are advantageous or in need of improvement. A structurally supported wheel 401 constructed in accordance with the present invention as more fully described below can offer improved compliance and stiffness characteristics, in a wheel requiring less maintenance than a pneumatic tire. In addition to use on motor vehicles, such a wheel could also be advantageously used, for example, on a wheel chair, a gurney, a hospital bed, a cart for sensitive equipment, or other vehicles or conveyances where sensitivity to shock is important. In addition, the wheel may be used in place of casters for chairs or other furniture, or as wheels for baby carriages, skate boards, in-line skates, etc. Wheel 401 of the invention could be used in machines or apparatuses where load bearing or load applying wheels are used. The term "vehicle" is used below for the purposes of the description; however, any device on which compliant wheels could be mounted is included in the following description and "vehicle" should be understood to include the same.

Wheel 401 as shown in FIGS. 10 and 11 has an annular band 405 and a plurality of tension transmitting elements, illustrated as web spokes 420, extending transversely across and inward from band 405, to a mounting band 425 at the radially inner end of the web spokes 420. Mounting band 425 anchors wheel 401 to a hub 430. A tread portion 410 is formed at the outer periphery of band 405. Tread portion 410 may be an additional layer bonded on the band 405, for example, to provide different traction and wear properties than the material used to construct band 405. Alternatively, tread portion 410 may be formed as part of the outer surface of the compliant band, as shown in FIG. 10. Tread features may be formed in the tread portion 410 and may include blocks 415 and grooves 440.

As mentioned, web spokes 420 in the exemplary embodiment of FIGS. 10 and 11 extend transversely across wheel 401, which as used herein means that the web spokes 420 extend from side to side of wheel 401 and may be aligned with the axis of rotation, or may be oblique to the wheel axis. Further, "extending inward" means that web spokes 420 extend between band 405 and mounting band 425, and may lie in a plane radial to the wheel axis or may be oblique to the radial plane. In addition, as shown in FIG. 10, web spokes 420 may actually include spokes at different angles to the radial plane. Various shapes and patterns may be used as shown, e.g., in U.S. Pat. No. 7,013,939.

Band 405 supports the load on wheel 401 and resiliently deforms to conform to the road (or other supporting surface) to provide traction and handling capabilities. More particularly, as described in U.S. Pat. No. 7,013,939, when a load is placed on the wheel 401 through hub 430, band 405 acts compliantly in that it bends and otherwise deforms for ground contact and forms a contact patch, which is the portion of wheel 401 that is in contact with the ground under such load. The portion of band 405 that is not in ground contact acts in a manner similar to an arch and provides a circumferential compression stiffness and a longitudinal bending stiffness in the equatorial plane sufficiently high to act as a load-supporting member. As used herein, "equatorial plane" means a plane that passes perpendicular to the wheel axis of rotation and bisects the wheel structure.

The load on the wheel 401, transmitted from the vehicle (not shown) to hub 430 essentially hangs by web spokes 420 attached to the load supporting portion of band 405. Web spokes 420 in the ground contacting region do not experience tensile loading due to the load. As wheel 401 rotates, of course, the specific portion of the compliant band 405 acting as an arch continually changes, however, the concept of an arch is useful for understanding the load supporting mechanism. The amount of bending of band 405, and accordingly, the size of the contact patch is proportional to the load. The ability of band 405 to bend resiliently under the load provides a compliant ground contact area that acts similar to that of a pneumatic tire, with similar advantageous results.

For example, band 405 can envelop obstacles to provide a smoother ride. Also, band 405 is able to transmit forces to the ground or road for traction, cornering, and steering. By contrast, in typical solid and cushion tires, the load is supported by compression of the tire structure in the contact area, which includes compression of the cushion material under the rigid hub. Compliance of the cushion material is limited by the compression properties of the material and the thickness of the material on the rigid wheel or hub.

Still referring to FIGS. 10 and 11, web spokes 420 are substantially sheet-like elements having a length L in the radial direction, a width W in the axial direction corresponding generally to the axial width of the compliant band 405, although other widths W may be used including widths W that vary along the radial direction as shown in FIG. 11. Web spokes 420 also have a thickness (i.e. a dimension perpendicular to length L and width W) that is generally much less than either the length L or the width W, which allows a web spoke to buckle or bend when under compression. Thinner web spokes will bend when passing through the contact area with substantially no compressive resistance, that is, supplying no or only insignificant compressive force to load bearing. As the thickness of web spokes 420 is increased, the web spokes may provide some compressive load bearing force in the ground contact area. The predominant load transmitting action of web spokes 420 as a whole, however, is in tension. The particular web spoke thickness may be selected to meet the specific requirements of the vehicle or application.

As seen in FIG. 11, preferably, web spokes 420 are oriented relative to the compliant band 405 across the axial direction A. Tension in web spokes 420 is, therefore, distributed across band 405 to support the load. By way of example, web spokes 420 may be formed of an elastomeric material having a tensile modulus of about 10 to 100 MPa. Web spokes 420 may be reinforced if desired. The material used to construct web spoke material 420 should also exhibit elastic behavior to return to original length after being strained to e.g., 30%, and to exhibit constant stress when the web spoke material is strained to e.g., 4%. Further, it is desirable to have a material with a tan $\delta$ of not more than 0.1 at the relevant operating conditions. For example, commercially available rubber or polyurethane materials can be identified which meet these requirements. By way of further example, Vibrathane B836 brand urethane from Chemtura Corporation of Middlebury, Conn. has been suitable for construction of web spoke 420.

For the exemplary embodiment of FIGS. 10 and 11, web spokes 420 are interconnected by radially inner mounting band 425, which encircles the hub 430 to mount wheel 401 to the hub 430. Depending on the construction materials and manufacturing process, hub 430, mounting band 425, annular band 405, and web spokes 420 may be molded as single unit. Alternatively, one or more of such components may be formed separately and then attached to each other through e.g., adhesives or molding. Additionally, other components may be included as well. For example, an interface band can be used to connect web spokes 420 at their radially outer ends, and then the interface band would be connected to band 405.

According to a further embodiment, web spokes 420 could be mechanically attached to hub 430, for example, by providing an enlarged portion on the inner end of each web spoke 420 that engages a slot device in hub 430, or by attaching adjacent web spokes 420 to form a loop at a hook or bar formed in hub 430.

Substantially purely tensile load support is obtained by having a web spoke 420 that has high effective stiffness in tension but very low stiffness in compression. To facilitate bending in a particular direction, web spokes 420 may be curved. Alternatively, web spokes 420 can be molded with a curvature and straightened by thermal shrinkage during cooling to provide a predisposition to bending in a particular direction.

Web spokes 420 should resist torsion between annular band 405 and hub 430, for example, when torque is applied to wheel 401. In addition, web spokes 420 should resist lateral deflection when, for example, turning or cornering. As will be understood, web spokes 420 that lie in the radial-axial plane, that is, are aligned with both the radial and axial directions, will have high resistance to axially directed forces, but, particularly if elongated in the radial direction R, may have relatively low resistance to torque in the circumferential direction C. For certain vehicles and applications, for example, those producing relatively low torque, a web spoke package having relatively short spokes 420 aligned with the radial direction R will be suitable. For applications where high torque is expected, one of the arrangements such as shown in FIGS. 5 through 8 of U.S. Pat. No. 7,013,939 may be more suitable. In the variations shown therein, orientations of web spokes are provided that include a force-resisting component in both the radial and the circumferential directions, thus adding resistance to torque, while retaining radial and lateral force-resisting components. The angle of orientation may be selected depending on the number of web spokes used and the spacing between adjacent web spokes. Other alternative arrangements may also be used.

One advantage of the compliant wheel of the invention is that the selection of the size and arrangement of band 405 and web spokes 420 allows the vertical, lateral, and torsional stiffness of the wheel to be tuned independently of the contact pressure and of each other. The operating parameters of band 405, load carrying and compliance, are determined in part by selection of materials having the circumferential compression stiffness and longitudinal bending stiffness in the equatorial plane to meet the design load requirements. These parameters are examined in view of the diameter of wheel 401, the width of annular band 405 in the axial direction A, the thickness of band 405 in radial direction R, and the length and spacing of web spokes 420. The number of web spokes is selected to maintain circularity of band 405, and will depend also on the spacing between adjacent web spokes 420.

Continuing with FIG. 11, as previously indicated, band 405 includes continuous loop reinforcement assembly 10, which may be e.g., molded integrally as part of non-pneumatic wheel 401 or constructed separately and then attached with the other elements of wheel 401. Where resilient spacer 200 is porous, the matrix material used to construct band 405 may also be used to impregnate spacer 200 by passing into and through its porous material. For example, resilient spacer 200 may be constructed as an open cell foam into which a polymer such as a polyurethane is received. A polyurethane suitable for such construction includes e.g., Vibrathane B836 brand urethane from Chemtura Corporation of Middlebury, Conn.

Figure 12:
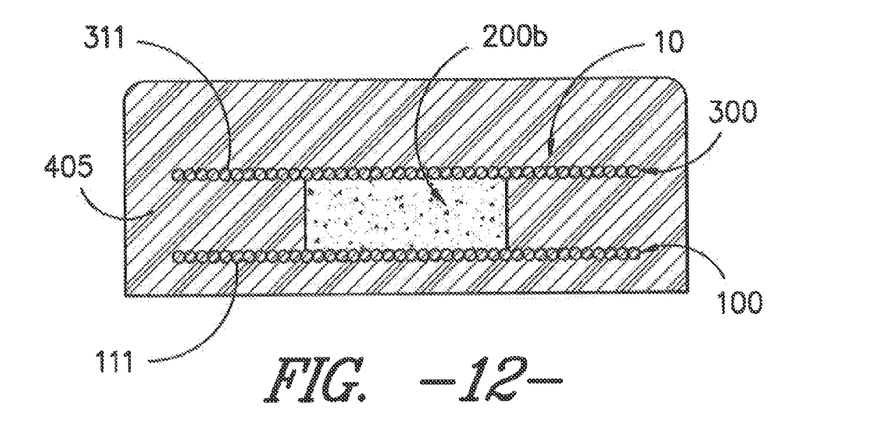
FIGS. 12 through 14 are partial, cross-sectional views of additional exemplary embodiments of an annular band 405 as may be used with the exemplary embodiment of a pneumatic tire 400 shown in FIG. 10.

FIG. 11 provides just one exemplary embodiment of a band 405 as may be used with the present invention. For example, FIG. 12 provides another example of a band 405 as may be used in wheel 401 (web spokes 420 are omitted from this cross-sectional view as well as the views of FIGS. 13 and 14). Here, the continuous loop reinforcement assembly 10 of FIG. 7 is shown incorporated into band 405. As shown, resilient spacer 200 is more narrow than first flexible cylindrical band 100 or second flexible cylindrical band 300. Resilient spacer 200 may be constructed as previously described.

Figure 13:
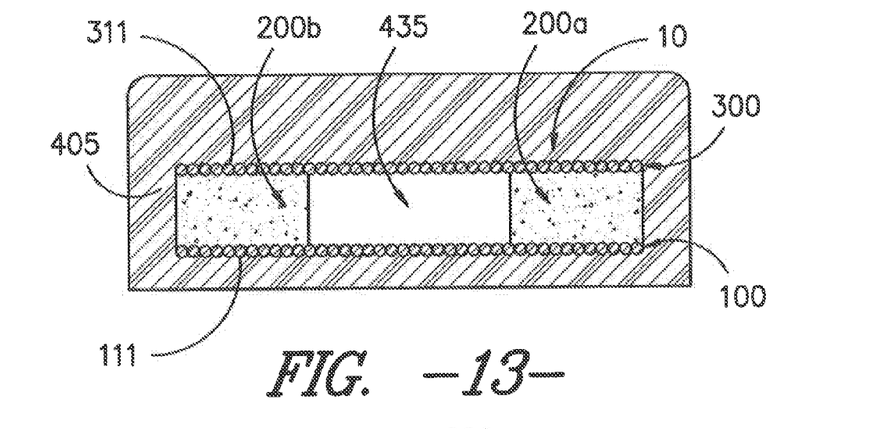

FIG. 13 provides another example of a band 405 as may be used in wheel 401, in which band 405 includes the continuous loop reinforcement assembly 10 of FIG. 8. As shown, resilient spacer 200 is constructed from two intermediate resilient spacers 200*a* and 200*b*. A space 435 is shown between spacers 200*a* and 200*b*. Space 435 may be open or may be filled with matrix material. Resilient spacers 200*a* and 200*b* may be constructed as previously described for spacer 200.

Figure 14:
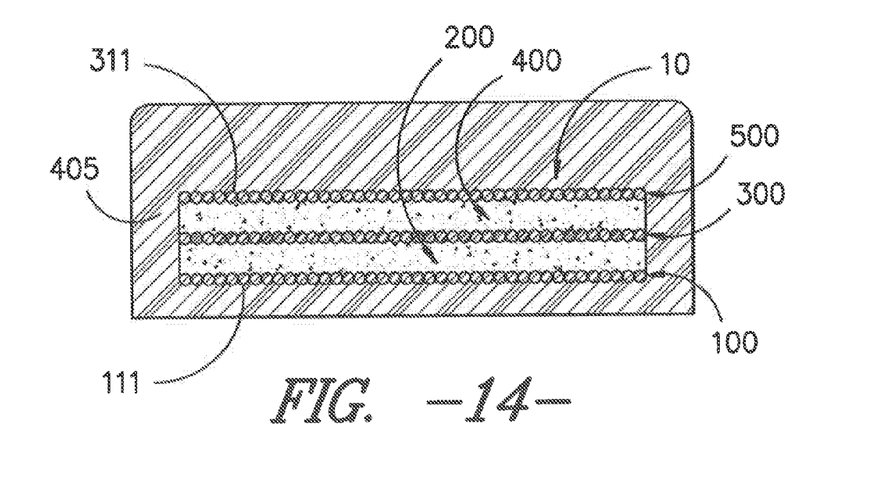

FIG. 14 provides still another example of a band 405 as may be used in wheel 401, in which band 405 includes the continuous loop reinforcement assembly 10 of FIG. 9. As shown, resilient spacer 200 is constructed from two resilient spacers 200 and 400 and includes a third flexible cylindrical reinforcement band 500. FIG. 14 is provided by way of example only, multiple additional spacers and flexible cylindrical bands may be added as well depending upon the application.

While the present subject matter has been described in detail with respect to specific exemplary embodiments and methods thereof, it will be appreciated that those skilled in the art, upon attaining an understanding of the foregoing may readily produce alterations to, variations of and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A non-pneumatic wheel, the wheel defining radial, circumferential, and transverse directions, the wheel comprising:
    an annular band supporting a ground contacting tread portion, said annular band extending about the circumferential direction;
    a continuous loop reinforcement assembly positioned within said annular band, the continuous loop reinforcement assembly comprising one or more materials wound into a helix that includes at least three revolutions about the circumferential direction;
    a mounting band positioned radially inward of said annular band; and,
    a plurality of web spokes connected to, and extending radially between, said annular band and said mounting band.

2. The non-pneumatic wheel as in claim 1, wherein said continuous loop reinforcement assembly comprises:
    a first flexible cylindrical band, and,
    a second flexible cylindrical band positioned apart from, and radially outward of, said first flexible cylindrical band.

3. The non-pneumatic wheel as in claim 2, further comprising,
    at least one retainer attached to said helix and configured for maintaining the integrity of said coil.

4. The non-pneumatic wheel as in claim 3, wherein said one or more materials of said helix are selected from the group comprising metal, steel, carbon, aramid, and glass.

5. The non-pneumatic wheel as in claim 3, wherein said at least one retainer comprises at least two materials with one have a higher melt temperature than the other.

6. The non-pneumatic wheel as in claim 5, wherein said at least two materials are configured in a core/sheath arrangement.

7. The non-pneumatic wheel as in claim 3, wherein said at least one retainer comprises one or more of the group comprising a monofilament yarn, multifilament yarn, and staple fiber yarns.

8. The non-pneumatic wheel as in claim 3, wherein said at least one retainer comprises:
    a tie reinforcing yarn; and,
    a structural reinforcing yarn having a greater stiffness than said tie reinforcing yarn.

9. The non-pneumatic wheel as in claim 8, wherein said tie reinforcing yarn comprises a material having a lower melt temperature than the melt temperature of said structural reinforcing yarn.

10. The non-pneumatic wheel as in claim 9, wherein said structural reinforcing yarn has a low shrinkage when heated to the lower melt temperature of said tie reinforcing yarn.

11. The non-pneumatic wheel as in claim 8, wherein said tie reinforcing yarn comprises:
    a lower melt temperature polymer; and
    a higher melt temperature polymer, said higher melt temperature polymer exhibiting shrinkage when heated to the melt temperature of said lower melt temperature polymer.

12. The non-pneumatic wheel as in claim 3, wherein said at least one retainer comprises a plurality of reinforcing yarns woven into said coil in a leno weave with cross-overs of the yarns occurring between the one or more materials of said coil.

13. The non-pneumatic wheel as in claim 3, wherein said at least one retainer comprises a plurality of reinforcing yarns woven into said coil in a Malimo style stitch knit pattern.

14. The non-pneumatic wheel as in claim 2, wherein said continuous loop reinforcement assembly further comprises a spacer positioned between said first flexible cylindrical band and said second flexible cylindrical band.

15. The non-pneumatic wheel as in claim 14, wherein said spacer comprises a porous material.

16. The non-pneumatic wheel as in claim 15, wherein the porous material comprises a reticulated foam.

17. The non-pneumatic wheel as in claim 15, wherein said annular band comprises a matrix material that is received into the porous material of said spacer.

18. The non-pneumatic wheel as in claim 17, wherein said matrix material comprises a polyurethane.

19. The non-pneumatic wheel as in claim 2, wherein said continuous loop reinforcement assembly further comprises a plurality of spacers positioned between said first flexible cylindrical band and said second flexible cylindrical band.

20. The non-pneumatic wheel as in claim 2, wherein said continuous loop reinforcement assembly comprises at least three flexible cylindrical bands, said cylindrical bands spaced apart from each other along the radial direction.

* * * * *